(12) United States Patent
Huang et al.

(10) Patent No.: US 11,812,304 B2
(45) Date of Patent: Nov. 7, 2023

(54) METHOD AND DEVICE FOR DATA ALLOCATION, MOBILE TERMINAL, AND STORAGE MEDIUM

(71) Applicant: GUANGDONG OPPO MOBILE TELECOMMUNICATIONS CORP., LTD., Guangdong (CN)

(72) Inventors: Yuan Huang, Guangdong (CN); Shixing Ke, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 197 days.

(21) Appl. No.: 17/399,034

(22) Filed: Aug. 10, 2021

(65) Prior Publication Data

US 2021/0377803 A1 Dec. 2, 2021

Related U.S. Application Data

(63) Continuation of application No. PCT/CN2020/074729, filed on Feb. 11, 2020.

(30) Foreign Application Priority Data

Feb. 12, 2019 (CN) .......................... 201910111714.2

(51) Int. Cl.
*H04W 28/08* (2023.01)
*H04W 76/15* (2018.01)
(Continued)

(52) U.S. Cl.
CPC ....... *H04W 28/0925* (2020.05); *H04W 28/10* (2013.01); *H04W 72/53* (2023.01);
(Continued)

(58) Field of Classification Search
CPC . H04W 28/09; H04W 28/0925; H04W 28/10; H04W 75/53; H04W 75/542; H04W 76/15
See application file for complete search history.

(56) References Cited

U.S. PATENT DOCUMENTS

| 9,730,108 B2 | 8/2017 | Villasenor |
| 2012/0127925 A1 | 5/2012 | Kim et al. |

(Continued)

FOREIGN PATENT DOCUMENTS

| CN | 105308919 | 2/2016 |
| CN | 105592500 | 5/2016 |

(Continued)

OTHER PUBLICATIONS

CNIPA, First Office Action for CN Application No. 201910111714.2, dated Mar. 6, 2020.

(Continued)

*Primary Examiner* — Gary Mui
(74) *Attorney, Agent, or Firm* — Hodgson Russ LLP (57) ABSTRACT

A method and device for data allocation, a mobile terminal, and a storage medium are provided. The method includes the following. In a dual Wi-Fi mode, a ratio for data packet allocation between a first Wi-Fi path and a second Wi-Fi path is determined according to at least one of an application-type-based allocation policy, a data-packet-type-based allocation policy, a link-quality-based allocation policy, or an access point (AP)-type-based allocation policy. The first Wi-Fi path includes a data path capable of data transmission to the first Wi-Fi module. The second Wi-Fi path includes a data path capable of data transmission to the second Wi-Fi module. Data packets are allocated to the first Wi-Fi path and the second Wi-Fi path for transmission according to the ratio for data packet allocation.

18 Claims, 4 Drawing Sheets

(51) Int. Cl.
*H04W 28/10* (2009.01)
*H04W 72/53* (2023.01)
*H04W 72/542* (2023.01)
*H04W 84/12* (2009.01)

(52) U.S. Cl.
CPC ......... *H04W 72/542* (2023.01); *H04W 76/15* (2018.02); *H04W 84/12* (2013.01)

(56) References Cited

U.S. PATENT DOCUMENTS

| | | | | |
|---|---|---|---|---|
| 2013/0010773 | A1* | 1/2013 | Hong | H04W 88/10 370/338 |
| 2013/0137423 | A1* | 5/2013 | Das | H04W 12/082 455/426.1 |
| 2015/0382279 | A1* | 12/2015 | Zhao | H04W 76/15 370/225 |
| 2017/0295512 | A1 | 10/2017 | Rangaswamy | |
| 2019/0021115 | A1 | 1/2019 | Gupta et al. | |
| 2019/0098566 | A1* | 3/2019 | Li | H04L 69/12 |
| 2020/0260517 | A1* | 8/2020 | Huang | H04W 76/14 |
| 2021/0336874 | A1* | 10/2021 | Huang | H04L 45/245 |
| 2021/0360650 | A1* | 11/2021 | Huang | H04W 28/0933 |
| 2021/0368571 | A1* | 11/2021 | Huang | H04W 76/16 |
| 2022/0159777 | A1* | 5/2022 | Lin | H04W 76/36 |

FOREIGN PATENT DOCUMENTS

| | | |
|---|---|---|
| CN | 106954237 | 7/2017 |
| CN | 107071816 | 8/2017 |
| CN | 107635234 | 1/2018 |
| CN | 107635248 | 1/2018 |
| CN | 107708216 | 2/2018 |
| CN | 107770814 | 3/2018 |
| CN | 108777666 | 11/2018 |
| CN | 109274596 | 1/2019 |
| EP | 3247150 | 11/2017 |
| EP | 3614629 | 2/2020 |
| WO | 2018064897 | 4/2018 |

OTHER PUBLICATIONS

CNIPA, Second Office Action for CN Application No. 201910111714.2, dated Jul. 3, 2020.
CNIPA, Notice of Allowance for CN Application No. 201910111714.2, dated Sep. 22, 2020.
WIPO, International Search Report for PCT/CN2020/074729, dated Apr. 15, 2020.
EPO, Extended European Search Report for EP Application No. 20755202.7, dated Feb. 28, 2022.

* cited by examiner

METHOD AND DEVICE FOR DATA ALLOCATION, MOBILE TERMINAL, AND STORAGE MEDIUM

CROSS-REFERENCE TO RELATED APPLICATIONS

The present application is a continuation of International Application No. PCT/CN2020/074729, filed on Feb. 11, 2020, which claims priority to Chinese Patent Application No. 201910111714.2, filed on Feb. 12, 2019, the entire disclosures of which are incorporated herein by reference.

TECHNICAL FIELD

This disclosure relates to the field of communication, and more particularly to a method and device for data allocation, a mobile terminal, and a storage medium.

BACKGROUND

Currently, a mobile terminal can gain internet access via a wireless fidelity (Wi-Fi®) hotspot by turning on a Wi-Fi connection switch. A current Wi-Fi network can only connect one Wi-Fi hotspot at a time, which cannot meet high data transmission requirements.

SUMMARY

A method and device for data allocation, a mobile terminal, and a storage medium are provided.

In a first aspect, a method for data allocation based on a dual Wi-Fi module is provided. The dual Wi-Fi module includes a first Wi-Fi module and a second Wi-Fi module. The method includes the following. In a dual Wi-Fi mode, a ratio for data packet allocation between a first Wi-Fi path and a second Wi-Fi path is determined according to at least one of an application-type-based allocation policy, a data-packet-type-based allocation policy, a link-quality-based allocation policy, or an access point (AP)-type-based allocation policy. The first Wi-Fi path includes a data path capable of data transmission to the first Wi-Fi module. The second Wi-Fi path includes a data path capable of data transmission to the second Wi-Fi module. Data packets are allocated to the first Wi-Fi path and the second Wi-Fi path for transmission according to the ratio for data packet allocation.

In a second aspect, a device for data allocation is provided. The device for data allocation is applicable to a dual Wi-Fi module. The dual Wi-Fi module includes a first Wi-Fi module and a second Wi-Fi module. The device includes a determining unit and an allocating unit. The determining unit is configured to determine, in a dual Wi-Fi mode, a ratio for data packet allocation between a first Wi-Fi path and a second Wi-Fi path according to at least one of an application-type-based allocation policy, a data-packet-type-based allocation policy, a link-quality-based allocation policy, or an AP-type-based allocation policy. The first Wi-Fi path includes a data path capable of data transmission to the first Wi-Fi module. The second Wi-Fi path includes a data path capable of data transmission to the second Wi-Fi module. The allocating unit is configured to allocate data packets to the first Wi-Fi path and the second Wi-Fi path for transmission according to the ratio for data packet allocation.

In a third aspect, a mobile terminal is provided. The mobile terminal includes a processor, a memory, and one or more programs stored in the memory and executed by the processor. The one or more programs include instructions for performing operations described in the first aspect.

In a fourth aspect, a computer-readable storage medium is provided. The computer-readable storage medium is configured to store computer programs for electronic data interchange (EDI) which, when executed, are operable with a computer to perform some or all operations described in the first aspect.

In a fifth aspect, a computer program product is provided. The computer program product includes a non-transitory computer-readable storage medium that stores computer programs. The computer programs are operable with a computer to execute some or all operations described in the first aspect. The computer program product may be a software installation package.

According to the method for data allocation based on the dual Wi-Fi module, in the dual Wi-Fi mode, the mobile terminal determines the ratio for data packet allocation between the first Wi-Fi path and the second Wi-Fi path according to the at least one of the application-type-based allocation policy, the data-packet-type-based allocation policy, the link-quality-based allocation policy, or the AP-type-based allocation policy. The first Wi-Fi path includes a data path capable of data transmission to the first Wi-Fi module. The second Wi-Fi path includes a data path capable of data transmission to the second Wi-Fi module. The mobile terminal allocates the data packets to the first Wi-Fi path and the second Wi-Fi path for transmission according to the ratio for data packet allocation. The implementations of the disclosure adopt the dual Wi-Fi module, which supports signal transmission and reception via two Wi-Fi paths at the same time.

BRIEF DESCRIPTION OF THE DRAWINGS

To describe technical solutions in implementations of the disclosure or the related art more clearly, the following briefly introduces accompanying drawings required for illustrating the implementations or the related art. Apparently, the accompanying drawings in the following description illustrate some implementations of the disclosure. Those of ordinary skill in the art may also obtain other drawings based on these accompanying drawings without creative efforts.

DETAILED DESCRIPTION

In order to enable those skilled in the art to better understand solutions of the disclosure, technical solutions in implementations of the disclosure will be described clearly and completely hereinafter with reference to the accompanying drawings in the implementations of the disclosure. Apparently, the described implementations are merely some rather than all implementations of the disclosure. All other implementations obtained by those of ordinary skill in the art based on the implementations of the disclosure without creative efforts shall fall within the protection scope of the disclosure.

The terms such as "first" and "second" used in the specification, the claims, and the accompany drawings of the disclosure are used for distinguishing between different objects rather than describing a particular order. The terms "include", "comprise", and "have" as well as variations thereof are intended to cover non-exclusive inclusion. For example, a process, system, product, or apparatus including a series of steps or units is not limited to the listed steps or units, it can optionally include other operations or units that are not listed; alternatively, other operations or units inherent to the process, product, or device can be included either.

The term "implementation" referred to herein means that a particular feature, structure, or feature described in connection with the implementation may be contained in at least one implementation of the disclosure. The phrase appearing in various places in the specification does not necessarily refer to the same implementation, nor does it refer an independent or alternative implementation that is mutually exclusive with other implementations. It is expressly and implicitly understood by those skilled in the art that an implementation described herein may be combined with other implementations.

A mobile terminal involved in the implementations of the disclosure may include various handheld devices, in-vehicle devices, wearable devices, computing devices that have wireless communication functions or other processing devices connected to the wireless modem, as well as various forms of user equipment (UE), mobile stations (MS), terminal devices, and the like. For the convenience of description, the above-mentioned devices are collectively referred to as a mobile terminal.

The implementations of the disclosure will be described in detail hereinafter.

Figure 1:
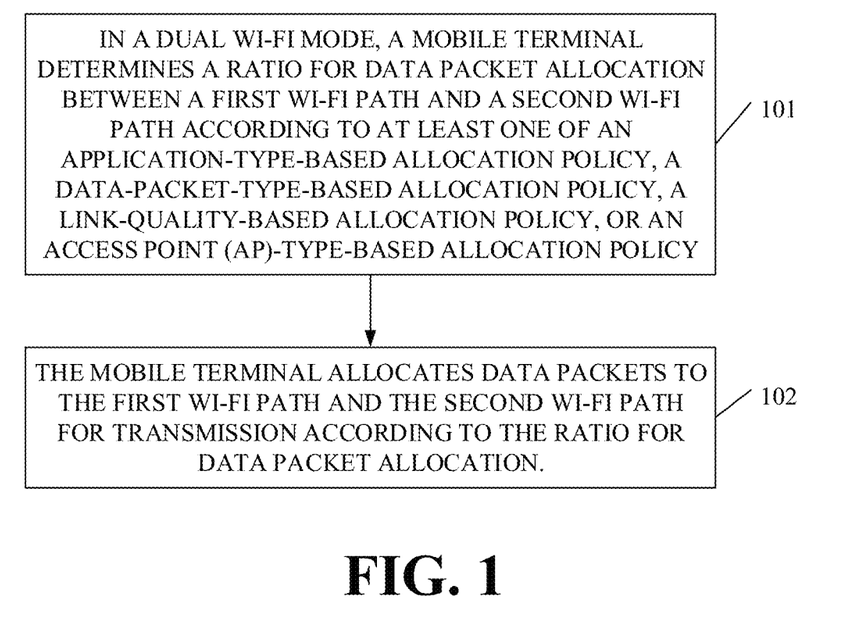
FIG. 1 is a schematic flow chart illustrating a method for data allocation based on a dual Wi-Fi module according to an implementation of the disclosure.

FIG. 1 is a schematic flow chart illustrating a method for data allocation based on a dual wireless-fidelity (Wi-Fi) module according to an implementation of the disclosure. As illustrated in FIG. 1, the method for data allocation begins at block 101.

At block 101, in a dual Wi-Fi mode, a mobile terminal determines a ratio for data packet allocation between a first Wi-Fi path and a second Wi-Fi path according to at least one of an application-type-based allocation policy, a data-packet-type-based allocation policy, a link-quality-based allocation policy, or an access point (AP)-type-based allocation policy.

The first Wi-Fi path includes a data path(s) to which the first Wi-Fi module is connected. The second Wi-Fi path includes a data path(s) to which the second Wi-Fi module is connected.

In implementations of the disclosure, Wi-Fi (also referred to as wifi or WiFi) is a wireless connection technology. The mobile terminal includes the dual Wi-Fi module. The dual Wi-Fi module includes the first Wi-Fi module (also referred to as a first Wi-Fi communication module) and the second Wi-Fi module (also referred to as a second Wi-Fi communication module), which can support signal transmission and reception in two Wi-Fi bands at the same time, and there is no interference between signals in the two Wi-Fi bands. The dual Wi-Fi module can be connected to two Wi-Fi hotspots at the same time and support data transmission and reception in two Wi-Fi paths (i.e., the first Wi-Fi path and the second Wi-Fi path). The first Wi-Fi module and the second Wi-Fi module support different frequency bands. For example, the first Wi-Fi module supports the 2.4 GHz frequency band, the second Wi-Fi module supports the 5 GHz frequency band. Alternatively, the first Wi-Fi module supports the 5 GHz frequency band, the second Wi-Fi module supports the 2.4 GHz frequency band. The first Wi-Fi path is a data path established between the mobile terminal and a wireless network via the first Wi-Fi module. The second Wi-Fi path is a data path established between the mobile terminal and the wireless network via the second Wi-Fi module.

Both the first Wi-Fi module and the second Wi-Fi module are in a station mode ("STA mode" for short). Both the first Wi-Fi module and the second Wi-Fi module need to connect to a Wi-Fi hotspot to access a Wi-Fi network. The Wi-Fi hotspot is an access point (AP). The AP may be a wireless AP.

The dual Wi-Fi mode is a mode in which two Wi-Fi modules perform data transmission and reception at the same time. In the dual Wi-Fi mode, the first Wi-Fi module and the second Wi-Fi module work at the same time without interfering with each other. In contrast, in a single Wi-Fi mode, one single Wi-Fi module works and signal transmission and reception in a single Wi-Fi frequency band is supported. The dual Wi-Fi module in the implementations of the disclosure has a dual-band dual-concurrent (DBDC) function and support 2×2 antennas. Each of the 2×2 antennas is equipped with amplifier circuits and power amplifier chips, so as to support signal transmission and reception at the same time.

In the implementations of the disclosure, the mobile terminal can determine a ratio for data packet allocation between the first Wi-Fi path and the second Wi-Fi path according to a data allocation policy, so as to determine a ratio for data transmission between the two data paths. The data allocation policy includes one or more of an application-type-based allocation policy, a data-packet-type-based allocation policy, a link-quality-based allocation policy, or an access point (AP)-type-based allocation policy. According to the application-type-based allocation policy, data of different applications are transmitted via different Wi-Fi paths. According to the data-packet-type-based allocation policy, data packets of different data types are transmitted via different Wi-Fi paths. As an example, according to the data-packet-type-based allocation policy, different Wi-Fi paths can be selected according to the minimum network delay and the minimum data transfer rate required for the data packets of different data types. According to the link-quality-based allocation policy, a ratio for data packet transmission between two Wi-Fi paths is determined according to link qualities of the two Wi-Fi paths. According to the AP-type-based allocation policy, a ratio for data packet transmission between the two Wi-Fi paths is determined according to types of APs connected to the two Wi-Fi paths.

Different data allocation policies can be applied to different scenarios. For example, the application-type-based allocation policy can be used in a scenario where applications have high requirements for network data transmission quality. In order to ensure smooth operation, some applications need to use the dual Wi-Fi mode. On the contrary, some applications have low requirements for network data transmission quality and therefore do not need to use the dual Wi-Fi mode, but simply use the single Wi-Fi mode. When multiple applications need to perform network data transmission at the same time, different application data can be allocated to different Wi-Fi paths for transmission. Application data refers to data exchanged between an application and a network. The data-packet-type-based allocation policy can be used in a scenario where data packet traffic is heavy. For example, when a video stream data packet transmission is detected, the data-packet-type-based allocation policy can be activated.

In an implementation, one or more of the application-type-based allocation policy, the data-packet-type-based allocation policy, the link-quality-based allocation policy, or the AP-type-based allocation policy can form a combined allocation policy. For example, a combined allocation policy formed by the data-packet-type-based allocation policy and the AP-type-based allocation policy can take both a data packet type and an AP type into consideration. For another example, the first AP is a rate-limited AP (for example, an AP in which a download rate is limited to 1 MB/S), the second AP is a non-limited rate AP, and the data packets to be transmitted include video stream data packets with high download speed requirements and control data packets with low download speed requirements. Here, the video stream data packets are allocated to the second AP for transmission, and the control data packets are allocated to the first AP for transmission.

At block 102, the mobile terminal allocates data packets to the first Wi-Fi path and the second Wi-Fi path for transmission according to the ratio for data packet allocation.

In the implementations of the disclosure, the mobile terminal is capable of transmitting uplink data packets as well as receiving downlink data packets. The data packets to be transmitted can be uplink data packets or downlink data packets. For the uplink data packets, the mobile terminal can allocate the uplink data packets to the first Wi-Fi uplink path and the second Wi-Fi uplink path for transmission. For the downlink data packets, the mobile terminal can allocate the downlink data packets to the first Wi-Fi downlink path and the second Wi-Fi downlink path for transmission.

The data packets to be transmitted can be initiated by different services of the mobile terminal. For example, the data packets to be transmitted can be initiated by any of a video service, a game service, a voice service, and an instant messaging service.

The dual Wi-Fi mode in the implementations of the disclosure is a link aggregation mode in which two Wi-Fi networks are turned on at the same time for network access. Link aggregation means that a device can use two or more than two network ports to access the network at the same time, that is, user's network access requests can be intelligently assigned to different Internet-accessible interfaces (for example, a first Wi-Fi communication module interface, a second Wi-Fi communication module interface).

The dual Wi-Fi module is adopted in the implementations of the disclosure. The dual Wi-Fi module can support data transmission and reception via two Wi-Fi paths at the same time. The mobile terminal can allocate the data packets to the first Wi-Fi path and the second Wi-Fi path for transmission, thereby improving the data transmission throughput of the Wi-Fi network.

In an implementation, at block 101, the mobile terminal determines the ratio for data packet allocation between the first Wi-Fi path and the second Wi-Fi path according to the application-type-based allocation policy as follows.

The mobile terminal determines a type of a foreground application currently running and determines a target ratio for data packet allocation corresponding to the type of the foreground application currently running according to a correspondence relationship between foreground application types and ratios for data packet allocation.

At block 102, the mobile terminal allocates the data packets to the first Wi-Fi path and the second Wi-Fi path for transmission according to the ratio for data packet allocation as follows.

The data packets are allocated to the first Wi-Fi path and the second Wi-Fi path for transmission according to the target ratio for data packet allocation.

In the implementations of the disclosure, the foreground application is an application that the mobile terminal currently runs in the foreground. One of the first Wi-Fi path and the second Wi-Fi path is the 2.4 GHz frequency band, the other is the 5 GHz frequency band. Since transmission effects (for example, a transmission delay, a packet loss rate, a downlink transfer rate, an uplink transfer rate, etc.) of different types of foreground applications are different in Wi-Fi paths of different frequency bands, the different types of foreground applications have different ratios for data packet allocation. The ratio for data packet allocation can be preset by the user. Alternatively, the ratio for data packet allocation can be comprehensively determined by the mobile terminal based on historical statistics of allocation ratios and the data packet transmission effects, so as to achieve the desirable data packet transmission effect for different applications. For example, a ratio for data packet allocation of the foreground application of the first type between the first Wi-Fi path and the second Wi-Fi path is X1:X2. A ratio for data packet allocation of the foreground application of the second type between the first Wi-Fi path and the second Wi-Fi path is Y1:Y2. A ratio for data packet allocation of the foreground application of the third type between the first Wi-Fi path and the second Wi-Fi path is Z1:Z2. For example, if the type of the foreground application currently running is the first type, the mobile terminal allocates the data packets to the first Wi-Fi path and the second Wi-Fi path for transmission according to the ratio for data packet allocation of X1:X2.

In the implementations of the disclosure, the ratio of data packet allocation of the data packets between the first Wi-Fi path and the second Wi-Fi path can be determined according to the type of application. As such, application usage experience in the dual Wi-Fi mode can be optimized, online experience of different types of applications in the dual Wi-Fi mode can be satisfied, and data transmission throughputs of different types of applications in the dual Wi-Fi mode can be further improved.

In an implementation, at block 101, the mobile terminal determines the ratio for data packet allocation between the first Wi-Fi path and the second Wi-Fi path according to the data-packet-type-based allocation policy as follows.

The mobile terminal obtains the type of the data packets to be transmitted and determines the ratio for data packet allocation between the first Wi-Fi path and the second Wi-Fi path of the data packets to be transmitted according to a correspondence relationship between data packet types and Wi-Fi paths.

In the implementations of the disclosure, one of the first Wi-Fi path and the second Wi-Fi path is the 2.4 GHz frequency band, the other is the 5 GHz frequency band. Since transmission effects (for example, a transmission delay, a packet loss rate, a downlink transfer rate, an uplink transfer rate, etc.) of different types of data packets are different in Wi-Fi paths of different frequency bands, the different types of data packets have different allocation ratios in the two Wi-Fi paths. The ratio for data packet allocation can be preset by the user. Alternatively, the ratio for data packet allocation can be comprehensively determined by the mobile terminal based on the historical statistics of allocation ratios and the data packet transmission effects, so as to achieve the desirable transmission effects for the different types of data packets. For example, an allocation ratio of the data packets of the first type between the first Wi-Fi path and the second Wi-Fi path is X1:X2. An allocation ratio of the data packets of the second type between the first Wi-Fi path and the second Wi-Fi path is Y1:Y2. An allocation ratio of third type data packets between the first Wi-Fi path and the second Wi-Fi path is Z1:Z2. For example, if the data packets to be transmitted is the first type, the mobile terminal allocates the data packets to the first Wi-Fi path and the second Wi-Fi path for transmission according to the allocation ratio of X1:X2.

In the implementations of the disclosure, the allocation ratio of the data packets between the first Wi-Fi path and the second Wi-Fi path can be determined according to the type of data packets. As such, application usage experience in the dual Wi-Fi mode can be optimized, online experience of different types of applications in the dual Wi-Fi mode can be satisfied, and data transmission effect of different types of data packets in the dual Wi-Fi mode can be further enhanced.

In an implementation, at block 101, the mobile terminal determines the ratio for data packet allocation between the first Wi-Fi path and the second Wi-Fi path according to the link-quality-based allocation policy as follows.

The mobile terminal detects a link quality of the first Wi-Fi path and a link quality of the second Wi-Fi path. The mobile terminal determines the ratio for data packet allocation between the first Wi-Fi path and the second Wi-Fi path according to the link quality of the first Wi-Fi path and the link quality of the second Wi-Fi path.

The link quality of the first Wi-Fi path can be determined according to a uplink/downlink data transfer rate, a round-trip time (RTT), a packet loss rate, a bit error rate, or the like of the first Wi-Fi path. A higher uplink/downlink data transfer rate, a smaller RTT, a lower packet loss rate, or a lower bit error rate leads to a higher link quality of the first Wi-Fi path. In contrast, a lower uplink/downlink data transfer rate, a greater RTT, a higher packet loss rate, or a higher bit error rate leads to a lower link quality of the first Wi-Fi path. Similarly, the link quality of the second Wi-Fi path can be determined by the uplink/downlink data transfer rate, the RTT, the packet loss rate, the bit error rate, or the like of the second Wi-Fi path.

The first Wi-Fi path may include a first Wi-Fi uplink path and a first Wi-Fi downlink path. A quality of the first Wi-Fi uplink path can be determined by the uplink data transfer rate, the RTT, the packet loss rate, the bit error rate, or the like of the first Wi-Fi path. A quality of the first Wi-Fi downlink path can be determined by the downlink data transfer rate, the RTT, the packet loss rate, the bit error rate, or the like of the first Wi-Fi path. Similarly, the second Wi-Fi path may include a second Wi-Fi uplink path and a second Wi-Fi downlink path.

The bit error rate is an index indicates the accuracy of data transmission within a specified time. The bit error rate=the number of bit errors÷the total number of transferred bits in transmission*100%.

The packet loss rate is the ratio of lost data packets to the total number of data packets transmitted.

In an implementation, the mobile terminal detects the link quality of the first Wi-Fi path as follows.

The mobile terminal measures the data transfer rate, the RTT, the packet loss rate, and the bit error rate of the first Wi-Fi path and determines the link quality of the first Wi-Fi path based on the RTT, the data transfer rate, the packet loss rate, and bit error rate measured of the first Wi-Fi path.

In an implementation, the mobile terminal detects the link quality of the second Wi-Fi path as follows.

The mobile terminal measures the data transfer rate, the RTT, the packet loss rate, and the bit error rate of the second Wi-Fi path and determines the link quality of the second Wi-Fi path based on the RTT, the data transfer rate, the packet loss rate, and the bit error rate of the second Wi-Fi path.

The mobile terminal detects a link quality of a mobile path as follows.

The mobile terminal measures a data transfer rate, a RTT, a packet loss rate, and a bit error rate of the mobile path and determines the link quality of the mobile path based on the RTT, the data transfer rate, the packet loss rate, and the bit error rate of the mobile channel.

In the implementations of the disclosure, if the link quality of the first Wi-Fi path is better than the link quality of the second Wi-Fi path, it is determined that a proportion of data packets to be allocated to the first Wi-Fi path is greater than a proportion of data packets to be allocated to the second Wi-Fi path. If the link quality of the second Wi-Fi path is better than that of the first Wi-Fi path, it is determined that the proportion of data packets to be allocated to the second Wi-Fi path is greater than the proportion of data packets to be allocated to the first Wi-Fi path. For example, if the link quality of the first Wi-Fi path is 20 and the link quality of the second Wi-Fi path is 80, then the ratio for data packet allocation between the first Wi-Fi path and the second Wi-Fi path is 2/8.

In an implementation, the link quality of the first Wi-Fi path can be evaluated based on the uplink/downlink data transfer rate, the RTT, the packet loss rate, and the bit error rate of the first Wi-Fi path to obtain a quality score of the first Wi-Fi path. Similarly, a quality score of the second Wi-Fi path can also be obtained. The mobile terminal can use the ratio of the quality score of the first Wi-Fi path to the quality score of the second Wi-Fi path as the ratio for data packet allocation between the first Wi-Fi path and the second Wi-Fi path.

In an implementation, the mobile terminal can also determine a quality level of the first Wi-Fi path according to the quality score of the first Wi-Fi path, and determine a quality level of the second Wi-Fi path according to the quality score of the second Wi-Fi path. The mobile terminal can determine the ratio for data packet allocation between the first Wi-Fi path and the second Wi-Fi path according to the quality level of the first Wi-Fi path and the quality level of the second Wi-Fi path.

As an example, the quality level of each of the first Wi-Fi path and the second Wi-Fi path can be graded into five levels: I, II, III, IV, and V, which respectively represents that the link quality is extremely poor, poor, medium, good, and excellent. The five grades of I, II, III, IV, and V correspond to quality scores of 0~30, 30~60, 60~80, 80~90, and 90~100 respectively. The ratio for data packet allocation between the first Wi-Fi path and the second Wi-Fi path can be determined according to the ratio of the quality level of the first Wi-Fi path to the quality level of the second Wi-Fi path. For example, if the link quality of the first Wi-Fi path is level I and the link quality of the second Wi-Fi path is level I, then the ratio for data packet allocation between the first Wi-Fi path and the second Wi-Fi path is 1:1. When the link quality of the first Wi-Fi path is level I and the link quality of the second Wi-Fi path is level IV, then the ratio for data packet allocation between the first Wi-Fi path and the second Wi-Fi path is 1:4.

In an implementation, the mobile terminal detects the link quality of the first Wi-Fi path and the link quality of the second Wi-Fi path as follows.

The mobile terminal measures the maximum data transfer rate of the first Wi-Fi path and the maximum data transfer rate of the second Wi-Fi path. The mobile terminal determines the link quality of the first Wi-Fi path based on the maximum data transfer rate of the first Wi-Fi path and determines the link quality of the second Wi-Fi path based on the maximum data transfer rate of the second Wi-Fi path.

In the implementations of the disclosure, the link quality of the first Wi-Fi path and the link quality of the second Wi-Fi path can be calculated according to the following formulas.

$$weigh\_wifi\_1 = max\_speed\_wifi\_1/(max\_speed\_wifi\_1 + max\_speed\_wifi\_2);$$

$$weigh\_wifi\_2 = max\_speed\_wifi\_2/(max\_speed\_wifi\_1 + max\_speed\_wifi\_2).$$

Weigh_wifi_1 represents the link quality of the first Wi-Fi path. Weight_wifi_2 represents the link quality of the second Wi-Fi path. Max_speed_wifi_1 represents the maximum data transfer rate of the first Wi-Fi path. Max_speed_wifi_2 represents the maximum data transfer rate of the second Wi-Fi path. The sum of the link quality of the first Wi-Fi path and the link quality of the second Wi-Fi path is equal to one.

The mobile terminal can determine the ratio for data packet allocation between the first Wi-Fi path and the second Wi-Fi path according to the ratio of the link quality of the first Wi-Fi path to the link quality of the second Wi-Fi path.

For example, when the link quality of the first Wi-Fi path is 0.3 and the link quality of the second Wi-Fi path is 0.7, it is determined that the ratio for data packet allocation between the first Wi-Fi path and the second Wi-Fi path is 3/7.

In an implementation, the maximum data transfer rate of the first Wi-Fi path and the maximum data transfer rate of the second Wi-Fi path can be corrected via a calculation rate of data increment of Wi-Fi.

For example, the calculation rate of data increment on the first Wi-Fi receive interface and the second Wi-Fi receive interface are counted every one second. The maximum data transfer rate of the first Wi-Fi path and the maximum data transfer rate of the second Wi-Fi path are corrected with the calculation rate of data increment.

$$tmp\_speed = (rx\_bytes - last\_rx\_bytes)/1;$$

$$max\_speed\_wifi\_1 \text{ corrected} = max(max\_speed\_wifi\_1, tmp\_speed);$$

$$max\_speed\_wifi\_2 \text{ corrected} = max(max\_speed\_wifi\_2, tmp\_speed).$$

Rx_bytes represents an amount of data received on each of the first Wi-Fi receive interface and the second Wi-Fi receive interface in one second. Last_rx_bytes represents an amount of data received on each of the first Wi-Fi interface and the second Wi-Fi interface in the last second. Tmp_speed represents the calculation rate of data increment. Max_speed_wifi_1 represents the maximum data transfer rate of the first Wi-Fi path. Max_speed_wifi_2 represents the maximum data transfer rate of the second Wi-Fi path. Max_speed_wifi_1 corrected is the maximum of max_speed_wifi_1 and tmp_speed. Max_speed_wifi_2 corrected is the maximum of max_speed_wifi_2 and tmp_speed.

In an implementation, the maximum data transfer rate of the first Wi-Fi path and the maximum data transfer rate of the second Wi-Fi path can be corrected by counting the RTT.

For example, the mobile terminal can calculate a delay at two interfaces (i.e., the first Wi-Fi communication module interface and the second Wi-Fi communication module interface) based on the RTT specified in the transmission control protocol (TCP). For one data link, only the RTT of the first request after three handshakes is calculated, for example, a RTT of HTTP get, a RTT of HTTP post. The three handshakes refer to three acknowledge processes for establishing a TCP connection. TCP uses tcp_rtt_estimator( ) function to estimate the RTT in order to calculate a retransmission timeout (RTO), and the delay is calculated with tcp_rtt_estimator( ) function.

The mobile terminal determines a current first RTT of the first Wi-Fi path and a current first RTT of the second Wi-Fi path as follows.

The mobile terminal determines a second RTT required for initiating one TCP. The mobile terminal respectively acquires a third RTT determined last time for the first Wi-Fi communication module and a third RTT determined last time for the second Wi-Fi communication module. The mobile terminal determines the current first RTT of the first Wi-Fi path and the current first RTT of the second Wi-Fi path according to the second RTT determined, the third RTT determined last time for the first Wi-Fi communication module, and the third RTT determined last time for the second Wi-Fi communication module.

As an example, the current first RTT of the first Wi-Fi path and the current first RTT of the second Wi-Fi path can be calculated through the following formulas.

$$rtt\_wifi\_11 = (rtt\_wifi\_13 + rtt\_2)/2;$$

$$rtt\_wifi\_21 = (rtt\_wifi\_23 + rtt\_2)/2.$$

Rtt_wifi_11 represents the current first RTT of the first Wi-Fi path. Rtt_2 represents the second RTT required for initiating one TCP. Rtt_wifi_13 represents the third RTT determined last time for the first Wi-Fi path. Rtt_wifi_21 represents the current first RTT of the second Wi-Fi path. Rtt_wifi_23 represents the third RTT determined last time for the second Wi-Fi path.

The implementations of the disclosure take the data transfer rate and the RTT into consideration when calculating the link quality of the Wi-Fi path, which can improve the calculation accuracy of the link qualities of the first Wi-Fi path and the second Wi-Fi path.

In an implementation, at block 101, the mobile terminal determines the ratio for data packet allocation between the first Wi-Fi path and the second Wi-Fi path according to the AP-type-based allocation policy as follows.

A type of an AP capable of data transmission to the first Wi-Fi module and a type of an AP capable of data transmission to the second Wi-Fi module are acquired. Security of the AP capable of data transmission to the first Wi-Fi module is determined according to the type of the AP capable of data transmission to the first Wi-Fi module. Security of the AP capable of data transmission to the second Wi-Fi module is determined according to the type of the AP capable of data transmission to the second Wi-Fi module. A type of data packets to be transmitted are determined. Security requirements for the data packets to be transmitted are determined. The ratio for data packet allocation between the first Wi-Fi path and the second Wi-Fi path is determined according to the security requirements, the security of the AP capable of data transmission to the first Wi-Fi module, and the security of the AP capable of data transmission to the second Wi-Fi module.

In the implementations of the disclosure, different APs (such as home APs, public APs, mobile hotspot APs, etc.) have different securities. The mobile terminal can detect the security of the AP to which the first Wi-Fi module is connected and the security of the AP to which the second Wi-Fi module is connected.

The mobile terminal determines the ratio for data packet allocation between the first Wi-Fi path and the second Wi-Fi path according to the security requirements of the data packets to be transmitted, the security of the AP to which the first Wi-Fi module is connected, and the security of the AP to which the second Wi-Fi module is connected as follows.

The mobile terminal determines that the security of the AP to which the first Wi-Fi module is connected to be a first security level, and the security of the AP to which the second Wi-Fi module is connected to be a second security level, where the security corresponding to the first security level is higher than the security corresponding to the second security level. In a case that the data packets to be transmitted include the first data packet and the second data packet, the security requirement of the first data packet is the first security level, and the security requirement of the second data packet is the second security level, then the first data packet in the data packets to be transmitted is allocated to the first Wi-Fi path for transmission, and the second data packet in the data packets to be transmitted is allocated to the second Wi-Fi path for transmission. In the implementations of the disclosure, the ratio for data packet allocation between the first Wi-Fi path and the second Wi-Fi path can be determined according to the security requirements for data packets to be transmitted, the security of the AP to which the first Wi-Fi module is connected, and the security of the AP to which the second Wi-Fi module is connected. As such, data allocation and transmission of data packets with different security requirements can be satisfied, the data transmission throughput and the security of data packet transmission can be increased.

Figure 2:
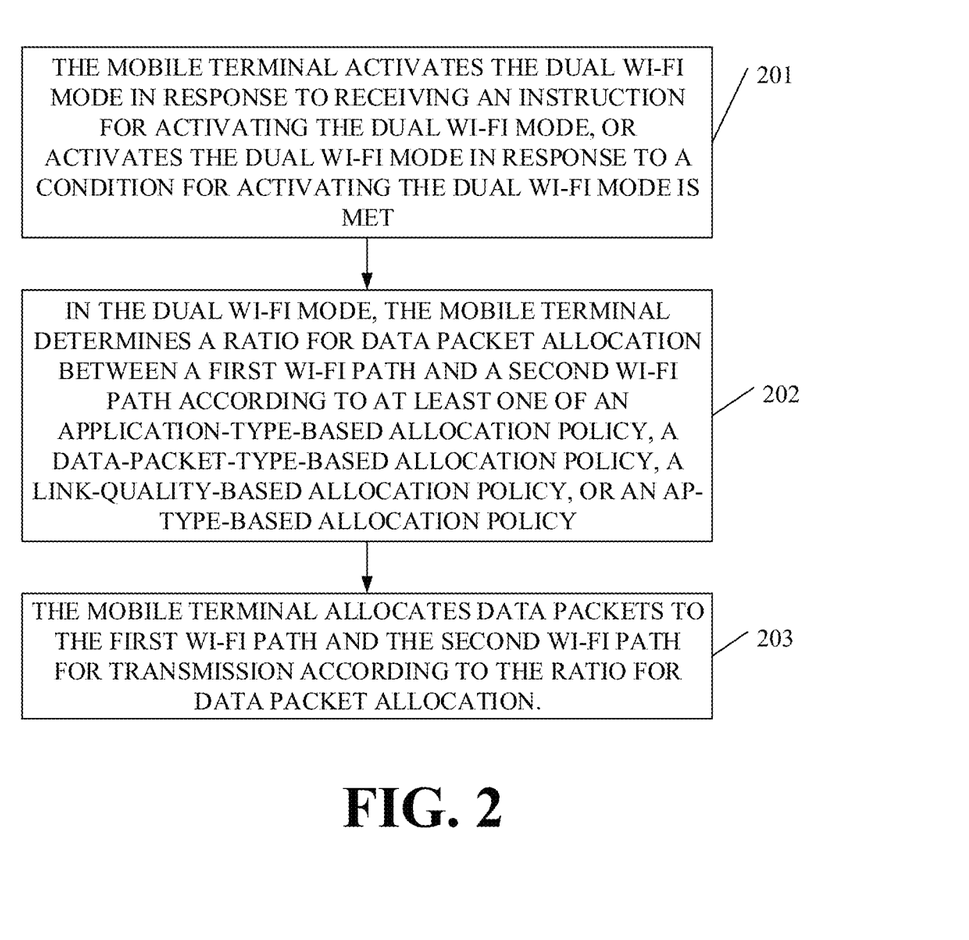
FIG. 2 is a schematic flow chart illustrating of a method for data allocation based on a dual Wi-Fi module according to another implementation of the disclosure.

FIG. 2 is a schematic flow chart illustrating of a method for data allocation based on a dual Wi-Fi module according to another implementation of the disclosure. As illustrated in FIG. 2, the method for data allocation based on the dual Wi-Fi module begins at block 201.

At block 201, the mobile terminal activates the dual Wi-Fi mode in response to receiving an instruction for activating the dual Wi-Fi mode, or activates the dual Wi-Fi mode in response to a condition for activating the dual Wi-Fi mode is met. As an example, the mobile terminal determines whether a condition for activating the dual Wi-Fi mode is met and activates the dual Wi-Fi mode based on a determination that the condition for activating the dual Wi-Fi mode is met.

In the implementations of the disclosure, activation of the dual Wi-Fi mode can be triggered by the user or by the mobile terminal. The mobile terminal can activate the dual Wi-Fi mode based on user setting. For example, the user can select whether to activate the dual Wi-Fi mode via a user setting interface of the mobile terminal. The mobile terminal can trigger the dual Wi-Fi mode by itself. For example, the mobile terminal can activate the dual Wi-Fi mode based on a current network quality/current network signal strength. The mobile terminal can activate the dual Wi-Fi mode based on user's control needs for the smart home which is determined based on scene recognition. The mobile terminal can activate the dual Wi-Fi mode based on projection operations for a specific application such as video. The implementations of the disclosure can provide at least two modes for activating the dual Wi-Fi mode, so that it is possible to enter the dual Wi-Fi mode flexibly.

In an implementation, the mobile terminal activates the dual Wi-Fi mode in response to receiving an instruction for activating the dual Wi-Fi mode at block 201 as follows.

The mobile terminal connects the second Wi-Fi module to a second frequency band AP in response to receiving a request for accessing the second frequency band AP. As such, the dual Wi-Fi mode is activated and a single Wi-Fi mode is inactivated, where in the single Wi-Fi mode, the first Wi-Fi module is connected to a first frequency band AP.

In the implementations of the disclosure, the mobile terminal can be in the single Wi-Fi mode before entering the dual Wi-Fi mode. In other words, the first Wi-Fi module of the mobile terminal is connected to the first frequency band AP, and the mobile terminal has established the first Wi-Fi path and can access a network through the first Wi-Fi path. Here, when receiving the request for accessing the second frequency band AP, the mobile terminal connects the second Wi-Fi module to the second frequency band AP. As such, the single Wi-Fi mode is inactivated, and the dual Wi-Fi mode is activated. In an example, the user can search for available hotspots (i.e., available APs) in the user setting interface, if at least one second frequency band AP exists in a list of available APs and the user clicks one second frequency band AP, it indicates that the user needs to access dual Wi-Fi, and then the dual Wi-Fi mode is activated. In this dual Wi-Fi mode, the first Wi-Fi module connects to the first frequency band AP, and the second Wi-Fi module connects to the second frequency band AP. In this implementation, in order to enter the dual Wi-Fi mode, the second Wi-Fi module can be directly connected to the second frequency band AP on the basis of the single Wi-Fi mode, without disconnecting the first frequency band AP connected in the single Wi-Fi mode. As such, it is possible to quickly enter the dual Wi-Fi mode from the single Wi-Fi mode through user interaction.

In an implementation, the mobile terminal activates the dual Wi-Fi mode in response to receiving an instruction for activating the dual Wi-Fi mode at block 201 as follows.

The mobile terminal selects a first frequency band AP and a second frequency band AP on condition that the first Wi-Fi module and the second Wi-Fi module are disconnected, and connects the first Wi-Fi module to the first frequency band AP and connects the second Wi-Fi module to the second frequency band AP. As an example, the mobile terminal can search for and select the first frequency band AP and the second frequency band AP when the first Wi-Fi module and the second Wi-Fi module are disconnected and the mobile terminal receives the instruction for activating the dual Wi-Fi mode, connect the first Wi-Fi module to the first frequency band AP and connect the second Wi-Fi module to the second frequency band AP.

In this implementation, the mobile terminal can be in a non-Wi-Fi connection mode before entering the dual Wi-Fi mode, that is, both the first Wi-Fi module and the second Wi-Fi module are disconnected. Here, when receiving a request for activating the dual Wi-Fi mode, the mobile terminal searches for and selects the first frequency band AP and the second frequency band AP, connects the first Wi-Fi module to the first frequency band AP, and connects the second Wi-Fi module connects to the second frequency band AP. For example, the user can click a button in the user setting interface to activate the dual Wi-Fi mode, the mobile terminal searches for and selects the first frequency band AP and the second frequency band AP, and connects the first Wi-Fi module to the first frequency band AP and connects the second Wi-Fi module to the second frequency band AP. In this implementation, the use can enter the dual Wi-Fi mode with one click operation, and can quickly enter the dual Wi-Fi mode through user interaction when there is no Wi-Fi module connected to a frequency band AP.

In an implementation, the mobile terminal selects the first frequency band AP and the second frequency band AP as follows.

The mobile terminal searches a list of available first frequency band APs, and selects an AP with the highest signal strength from at least one first frequency historically connected to the first Wi-Fi module in the list of available first frequency band APs as the first frequency band AP. The mobile terminal searches a list of available second frequency band APs, and selects an AP with the highest signal strength from at least one second frequency historically connected to the second Wi-Fi module in the list of available second frequency band APs as the second frequency band AP. As an example, the mobile terminal can search a list of currently available first frequency band APs, select an AP with the highest signal strength from at least one historically connected first frequency band AP as the first frequency band AP when the at least one historically connected first frequency band AP exists in the list of the currently available first frequency band APs. The mobile terminal can search a list of currently available second frequency band APs, select an AP with the highest signal strength from at least one historically connected second frequency band AP as the second frequency band AP when the at least one historically connected second frequency band AP exists in the list of the currently available second frequency band APs.

In the implementations of the disclosure, when the mobile terminal selects an AP (which can be considered as a Wi-Fi hotspot), a historically connected AP can be selected, specifically, an AP with the highest signal strength can be selected from historically connected APs. Since wireless connection of the historically connected AP does not require manual password verification, and the security thereof has been verified, it is possible to quickly and safely enter the dual Wi-Fi mode.

In an implementation, the mobile terminal determines whether a condition for activating the dual Wi-Fi mode is met at block 201 as follows.

In the single Wi-Fi mode, the mobile terminal selects the second frequency band AP and connects the second Wi-Fi module to the second frequency band AP in response to a required download rate being greater than the maximum download rate provided by the first frequency band AP, or a required uplink rate being greater than the maximum uplink rate provided by the first frequency band AP, where the first Wi-Fi module is connected to the first frequency band AP.

In the implementations of the disclosure, in the single Wi-Fi mode, whether to activate the dual Wi-Fi mode is determined according to whether the maximum download/uplink rate provided by the first frequency band AP in the current single Wi-Fi mode meets the current download/uplink rate requirements. The current download/uplink rate requirement can be determined according to the type of a currently running service, and different service types have different requirements for the download/uplink rate. The service types may include a video service, a game service, a voice service, an instant messaging service, and the like. For example, when the current service type is the video service, there is a high requirement for download speed, and when the current service type is a game service, there is a high requirement for uplink speed. In the implementations of the disclosure, whether to activate the dual Wi-Fi mode can be determined according to the current download rate required, which can save power consumption while ensuring the user's browsing experience.

In an implementation, the condition for activating the dual Wi-Fi mode includes that a specified type of application is activated. As an example, the mobile terminal determines whether a condition for activating the dual Wi-Fi mode is met at block 201 as follows.

The mobile terminal detects whether the specified type of application is activated and determines that the condition for activating the dual Wi-Fi mode is met based on a determination that the specified type of application is activated.

In the implementations of the disclosure, due to high speed requirements of certain types of applications, the dual Wi-Fi mode needs to be activated to meet the requirements. Therefore, when certain specified types of applications are turned on while the dual Wi-Fi mode is not activated yet, it is determined that the condition for activating the dual Wi-Fi mode is met, and then the dual Wi-Fi mode is activated. The specified type of applications may include a video application, a game application, and the like. In the implementations of the disclosure, it is possible to determine whether to activate the dual Wi-Fi mode according to the type of application, which can save power consumption while ensuring the application experience.

At block 202, in the dual Wi-Fi mode, the mobile terminal determines a ratio for data packet allocation between a first Wi-Fi path and a second Wi-Fi path according to at least one of an application-type-based allocation policy, a data-packet-type-based allocation policy, a link-quality-based allocation policy, or an AP-type-based allocation policy.

At block 203, the mobile terminal allocates data packets to the first Wi-Fi path and the second Wi-Fi path for transmission according to the ratio for data packet allocation.

In the implementations of the disclosure, for specific operations carried out at block 202 and block 203, reference may be made to block 101 and block 102 illustrated in FIG. 1, which will not be repeated herein.

In the implementations of the disclosure, the dual Wi-Fi module is adopted. The dual Wi-Fi module is capable of supporting signal transmission and reception via two Wi-Fi paths at the same time. The mobile terminal allocates the data packets to the first Wi-Fi path and the second Wi-Fi path for transmission, thereby improving the data transmission throughput of the Wi-Fi network. Both manual and automatic triggering of the dual Wi-Fi mode are supported and two methods for activating the dual Wi-Fi mode can be provided, therefore, it is possible to enter the dual Wi-Fi mode flexibly.

The foregoing solution of the implementations of the disclosure is mainly described from the viewpoint of execution process of the method. It can be understood that, in order to implement the above functions, the mobile terminal includes hardware structures and/or software modules corresponding to the respective functions. Those skilled in the art should readily recognize that, in combination with the example units and scheme steps provided in the implementations disclosed herein, the disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the described functions for each particular application, but such implementation should not be considered as beyond the scope of the disclosure.

According to the implementations of the disclosure, functional units may be divided for the mobile terminal in accordance with the foregoing method examples. For example, each functional unit may be divided according to each function, and two or more functions may be integrated in one processing unit. The above-mentioned integrated unit can be implemented in the form of hardware or software functional units. It should be noted that the division of units in the implementations of the disclosure is schematic, and is merely a logical function division, and there may be other division manners in actual implementation.

Figure 3:
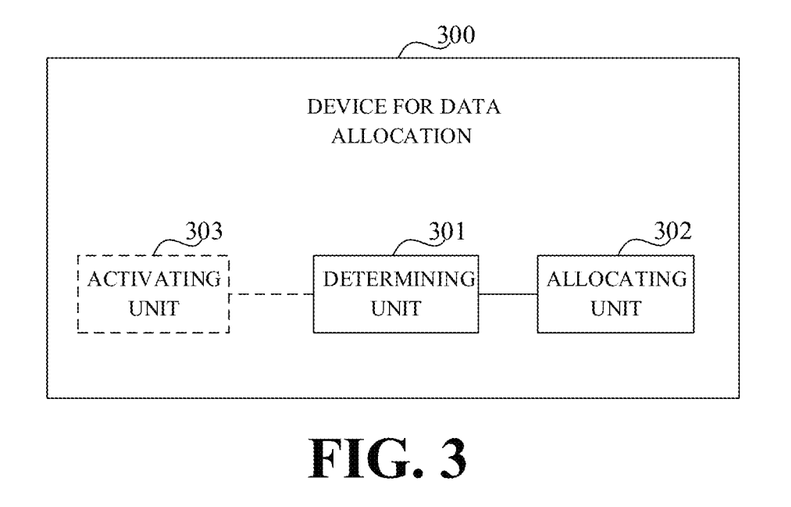
FIG. 3 is a schematic structural diagram of a device for data allocation according to an implementation of the disclosure.

FIG. 3 is a schematic structural diagram of a device for data allocation according to an implementation of the disclosure. The device for data allocation is applicable to a dual Wi-Fi module. The dual Wi-Fi module includes a first Wi-Fi module and a second Wi-Fi module. As illustrated in FIG. 3, the device 300 for data allocation includes a determining unit 301 and an allocating unit 302.

The determining unit 301 is configured to determine, in a dual Wi-Fi mode, a ratio for data packet allocation between a first Wi-Fi path and a second Wi-Fi path according to at least one of an application-type-based allocation policy, a data-packet-type-based allocation policy, a link-quality-based allocation policy, or an AP-type-based allocation policy, where the first Wi-Fi path includes a data path(s) to which the first Wi-Fi module is connected, and the second Wi-Fi path includes a data path(s) to which the second Wi-Fi module is connected.

The allocating unit 302 is configured to allocate data packets to the first Wi-Fi path and the second Wi-Fi path for transmission according to the ratio for data packet allocation.

In an implementation, the device 300 for data allocation further includes an activating unit 303.

The activating unit 303 is configured to activate the dual Wi-Fi mode in response to receiving an instruction for activating the dual Wi-Fi mode. Alternatively, the activating unit 303 is configured to activate the dual Wi-Fi mode based on a determination that a condition for activating the dual Wi-Fi mode is met.

In an implementation, the activating unit 303 is configured to activate the dual Wi-Fi mode in response to receiving the instruction for activating the dual Wi-Fi mode as follows.

The activating unit 303 is configured to connect the second Wi-Fi module to a second frequency band AP in response to a request for accessing the second frequency band AP received. As such, the dual Wi-Fi mode is activated and a single Wi-Fi mode is inactivated, where in the single Wi-Fi mode, the first Wi-Fi module is connected to a first frequency band AP.

In an implementation, the activating unit 303 is configured to activate the dual Wi-Fi mode in response to receiving the instruction for activating the dual Wi-Fi mode as follows.

The activating unit 303 is configured to select a first frequency band AP and a second frequency band AP on condition that the first Wi-Fi module and the second Wi-Fi module are disconnected, connects the first Wi-Fi module to the first frequency band AP and connects the second Wi-Fi module to the second frequency band AP. As an example, the activating unit 303 can search for and select the first frequency band AP and the second frequency band AP, connect the first Wi-Fi module to the first frequency band AP and connect the second Wi-Fi module to the second frequency band AP, when the first Wi-Fi module and the second Wi-Fi module are disconnected, and the instruction for activating the dual Wi-Fi mode is received.

In an implementation, the activating unit 303 is configured to select the first frequency band AP and the second frequency band AP as follows.

The activating unit 303 is configured to search a list of available first frequency band APs, and select an AP with the highest signal strength from at least one first frequency historically connected to the first Wi-Fi module in the list of available first frequency band APs as the first frequency band AP. The activating unit 303 is configured to search a list of available second frequency band APs, and select an AP with the highest signal strength from at least one second frequency historically connected to the second Wi-Fi module in the list of available second frequency band APs as the second frequency band AP. As an example, the activating unit 303 is configured to search a list of currently available first frequency band APs, select an AP with the highest signal strength from at least one historically connected first frequency band AP as the first frequency band AP when the at least one historically connected first frequency band AP exists in the list of the currently available first frequency band APs. The activating unit 303 is configured to search a list of currently available second frequency band APs, select an AP with the highest signal strength from at least one historically connected second frequency band AP as the second frequency band AP when the at least one historically connected second frequency band AP exists in the list of the currently available second frequency band APs.

In an implementation, the activating unit 30 is configured to determine whether the condition for activating the dual Wi-Fi mode is met as follows.

In the single Wi-Fi mode, The activating unit 30 is configured to select the second frequency band AP and connect the second Wi-Fi module to the second frequency band AP in response to a required download rate being greater than the maximum download rate provided by the first frequency band AP, or a required current uplink rate being greater than the maximum uplink rate provided by the first frequency band AP, where the first Wi-Fi module is connected to the first frequency band AP.

In an implementation, the condition for activating the dual Wi-Fi mode includes that a specified type of application is activated. As an example, the activating unit 30 is configured to determine whether the condition for activating the dual Wi-Fi mode is met as follows. The activating unit 30 is configured to detect whether the specified type of application is activated, and determine that the condition for activating the dual Wi-Fi mode is met based on a determination that the specified type of application is activated.

In an implementation, the determining unit 301 is configured to determine the ratio for data packet allocation between the first Wi-Fi path and the second Wi-Fi path according to the application-type-based allocation policy as follows. The determining unit 301 is configured to determine a type of a foreground application currently running, and determine a target ratio for data packet allocation corresponding to the type of the foreground application currently running according to a correspondence relationship between foreground application types and ratios for data packet allocation.

The allocating unit 302 is configured to allocate the data packets to the first Wi-Fi path and the second Wi-Fi path for transmission according to the ratio for data packet allocation as follows. The allocating unit 302 is configured to allocate the data packets to the first Wi-Fi path and the second Wi-Fi path for transmission according to the target ratio for data packet allocation.

In an implementation, the determining unit 301 is configured to determine the ratio for data packet allocation between the first Wi-Fi path and the second Wi-Fi path according to the data-packet-type-based allocation policy as follows. The determining unit 301 is configured to obtain a type of the data packets, and determine the ratio for data packet allocation between the first Wi-Fi path and the second Wi-Fi path of the data packets according to a correspondence relationship between data packet types and Wi-Fi paths.

In an implementation, the determining unit 301 is configured to determine the ratio for data packet allocation between the first Wi-Fi path and the second Wi-Fi path according to the link-quality-based allocation policy as follows.

The determining unit 301 is configured to detect a link quality of the first Wi-Fi path and a link quality of the second Wi-Fi path, and determines the ratio for data packet allocation between the first Wi-Fi path and the second Wi-Fi path according to the link quality of the first Wi-Fi path and the link quality of the second Wi-Fi path.

In an implementation, the determining unit 301 is configured to determine the ratio for data packet allocation between the first Wi-Fi path and the second Wi-Fi path according to the AP-type-based allocation policy as follows.

The determining unit 301 is configured to: acquire a type of an AP capable of data transmission to the first Wi-Fi module and a type of an AP capable of data transmission to the second Wi-Fi module; determine security of the AP capable of data transmission to the first Wi-Fi module according to the type of the AP capable of data transmission to the first Wi-Fi module, and determine security of the AP capable of data transmission to the second Wi-Fi module according to the type of the AP capable of data transmission to the second Wi-Fi module; determine a type of data packets and determining security requirements for the data packets; and determine the ratio for data packet allocation between the first Wi-Fi path and the second Wi-Fi path according to the security requirements, the security of the AP capable of data transmission to the first Wi-Fi module, and the security of the AP capable of data transmission to the second Wi-Fi module.

As an example, the determining unit 301, each of the allocating unit 302, and the activating unit 303 illustrated in FIG. 3 can be a processor.

In the device 300 for data allocation illustrated in FIG. 3, the dual Wi-Fi module is capable of supporting signal transmission and reception via two Wi-Fi paths at the same time. The mobile terminal allocates the data packets to be transmitted to the first Wi-Fi path and the second Wi-Fi path for transmission, thereby improving the data transmission throughput of the Wi-Fi network.

Figure 4:
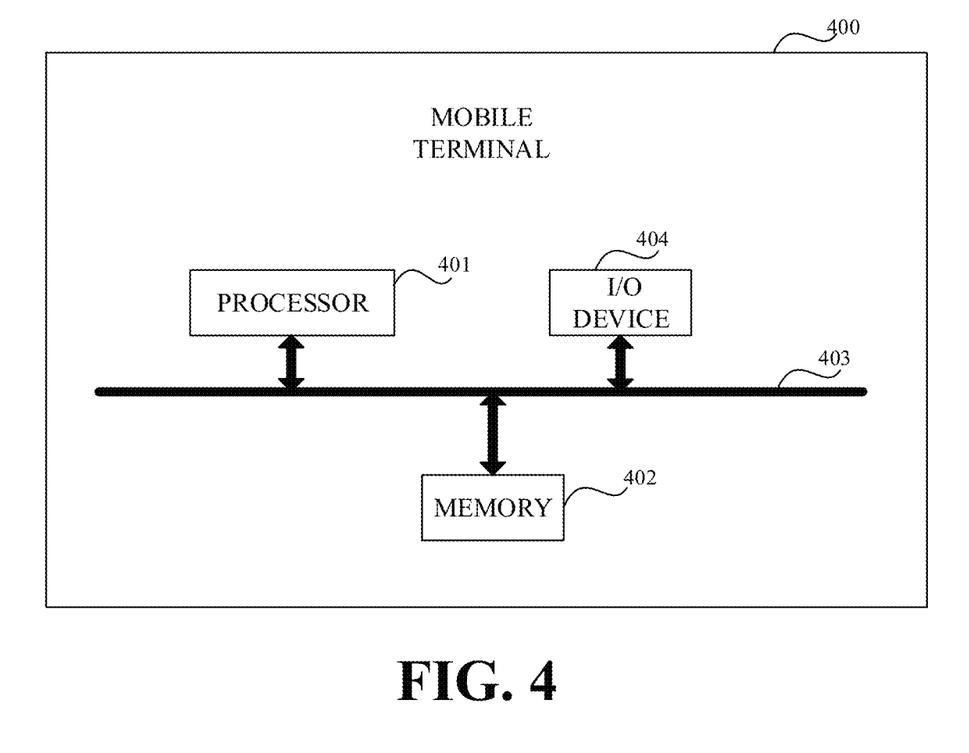
FIG. 4 is a schematic structural diagram of a mobile terminal according to an implementation of the disclosure.

FIG. 4 is a schematic structural diagram of a mobile terminal according to an implementation of the disclosure. As illustrated in FIG. 4, the mobile terminal 400 includes a processor 401 and a memory 402. The mobile terminal 400 may further include a bus 403. The processor 401 can be connected to the memory 402 via the bus 403.

The bus 403 may be a peripheral component interconnect (PCI) bus, an extended industry standard architecture (EISA) bus, or the like. The bus 403 can be divided into an address bus, a data bus, a control bus, and so on. For ease of representation, only one thick line is used in FIG. 4 to represent the bus 403, but it does not mean that there is only one bus or one type of bus. The mobile terminal 400 may also include an input/output (I/O) device 404. The I/O device 404 may include a display screen, such as a liquid crystal display screen. The memory 402 is used to store one or more programs including instructions. The processor 401 is configured to call the instructions stored in the memory 402 to execute some or all operations carried out in the methods illustrated in FIGS. 1 to 2.

In the mobile terminal 400 illustrated in FIG. 4, the dual Wi-Fi module is capable of supporting signal transmission and reception via two Wi-Fi paths at the same time. The mobile terminal allocates the data packets to be transmitted to the first Wi-Fi path and the second Wi-Fi path for transmission, thereby improving the data transmission throughput of the Wi-Fi network.

Figure 5:
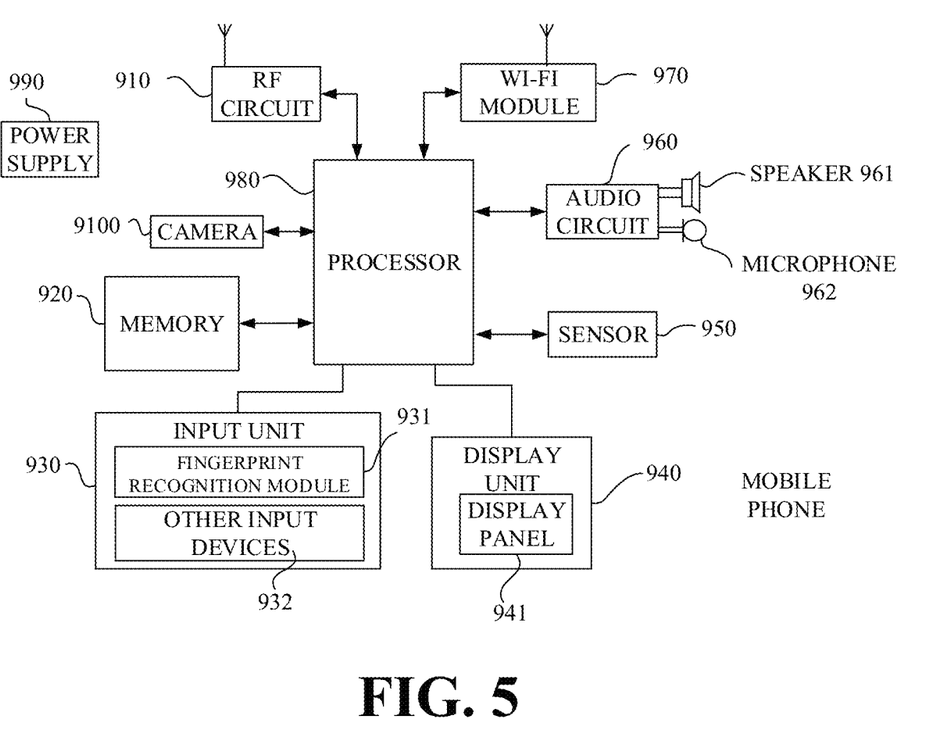
FIG. 5 is a schematic structural diagram of a mobile terminal according to another implementation of the disclosure.

An implementation of the disclosure further provides another mobile terminal. As illustrated in FIG. 5, only parts related to the implementations of the disclosure are illustrated for ease of description. For technical details not described, reference may be made to the method implementations of the disclosure. The mobile terminal may be any terminal device, such as a mobile phone, a tablet computer, a personal digital assistant (PDA), a point of sale terminal (POS), an on-board computer and the like. The following describes the mobile phone as an example of the mobile terminal.

FIG. 5 is a block diagram of a part of a structure of a mobile phone related to a mobile terminal according to an implementation of the disclosure. As illustrated in FIG. 5, the mobile phone includes a RF (radio frequency) circuit 910, a memory 920, an input unit 930, a display unit 940, a sensor 950, an audio circuit 960, a Wi-Fi (wireless fidelity) module 970, a processor 980, a power supply 990 and other components. Those skilled in the art can understand that the structure of the mobile phone illustrated in FIG. 5 does not constitute any limitation on a mobile phone. The mobile phone configured to implement technical solutions of the disclosure may include more or fewer components than illustrated or may combine certain components or different components.

In the following, various components of the mobile phone will be described in detail with reference to FIG. 5.

The RF circuit 910 is configured to transmit or receive information. Generally, the RF circuit 910 includes but is not limited to an antenna, at least one amplifier, a transceiver, a coupler, a low noise amplifier (LNA), a duplexer, and the like. In addition, the RF circuit 910 may also communicate with the network and other devices via wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS) and so on.

The memory 920 is configured to store software programs and modules, and the processor 980 is configured to execute various function applications and data processing of the mobile phone by running the software programs and the modules stored in the memory 920. The memory 920 mainly includes a program storage area and a data storage area. The program storage area may store an operating system, application programs required for at least one function and so on. The data storage area may store data created according to use of the mobile phone, and so on. In addition, the memory 920 may include a high-speed RAM, and may further include a non-volatile memory such as at least one disk storage device, a flash device, or other non-volatile solid storage devices.

The input unit 930 may be configured to receive input digital or character information and generate key signal input associated with user setting and function control of the mobile phone. As one implementation, the input unit 930 may include a fingerprint recognition module 931 and other input devices 932. The fingerprint recognition module 931 can collect fingerprint data of the user. In addition to the fingerprint recognition module 931, the input unit 930 may further include other input devices 932. As one implementation, the other input devices 932 may include, but not limit to, one or more of a touch screen, a physical keyboard, a function key (such as a volume control key, a switch key, etc.), a trackball, a mouse, a joystick and the like.

The display unit 940 is configured to display information input by the user or information provided for the user or various menus of the mobile phone. The display unit 940 may include a display screen 941, and alternatively, the display screen 941 may be in the form of a liquid crystal display (LCD), an organic light-emitting diode (OLED), an inorganic light-emitting diodes, and so on.

The mobile phone may also include at least one sensor 950, such as a light sensor, a motion sensor, a pressure sensor, a temperature sensor, and other sensors. As one implementation, the light sensor may include an ambient light sensor (also known as a light sensor) and a proximity sensor, among which the ambient light sensor may adjust the backlight brightness of the mobile phone and in turn adjust the brightness of the display screen 941 according to ambient lights, and the proximity sensor may turn off the display screen 941 and/or backlight when the mobile phone reaches nearby the ear. As a kind of motion sensor, the accelerometer sensor can detect the magnitude of acceleration in all directions (typically three axes) and when the mobile phone is stationary, the accelerometer sensor can detect the magnitude and direction of gravity; the accelerometer sensor can also identify mobile-phone gestures related applications (such as vertical and horizontal screen switch, magnetometer attitude calibration), or the accelerometer sensor can be used for vibration-recognition related functions (such as a pedometer, percussion) and so on. The mobile phone can also be equipped with a gyroscope, a barometer, a hygrometer, a thermometer, and infrared sensor and other sensors, and it will not be repeated herein.

The audio circuit 960, the speaker 961, the microphone 962 may provide an audio interface between the user and the mobile phone. The audio circuit 960 may convert the received audio data into electrical signals and transfer the electrical signals to the speaker 961; thereafter the speaker 961 converts the electrical signals into sound signals to output. On the other hand, the microphone 962 converts the received sound signals into electrical signals, which will be received and converted into audio data by the audio circuit 960 to output. The audio data is then processed and transmitted by the processor 980 via a RF circuit 910 to another mobile phone for example, or, the audio data is output to the memory 920 for further processing.

Wi-Fi belongs to a short-range wireless transmission technology. With aid of the Wi-Fi module 970, the mobile phone may assist the user in E-mail receiving and sending, webpage browsing, access to streaming media and the like. Wi-Fi provides users with wireless broadband Internet access. Although the Wi-Fi module 970 is illustrated in FIG. 5, the Wi-Fi module 970 is not essential to the mobile phone and can be omitted according to actual needs without departing from the essential nature of the disclosure.

The processor 980 is the control center of the mobile phone and is configured to connect various parts of the whole mobile phone through various interfaces and lines, run or execute software programs and/or modules stored in the memory 920, and invoke data stored in the memory 920 to perform various functions of the mobile phone and process data, thereby monitoring the mobile phone as a whole. In at least one implementation, the processor 980 may include one or more processing units. For example, the processor 980 may integrate an application processor and a modem processor, where the application processor is configured to handle the operating system, the user interface, the application, and so on, and the modem processor is mainly configured to process wireless communication. It will be understood that the above-mentioned modem processor may not be integrated into the processor 980.

The mobile phone also includes a power supply 990 (e.g., a battery) that supplies power to various components. For instance, the power supply 990 may be logically connected to the processor 980 via a power management system to enable management of charging, discharging, and power consumption through the power management system.

The mobile phone may also include a camera 9100, which is used to capture images and videos, and transmit the images and videos captured to the processor 980 for processing.

The mobile phone may also include a Bluetooth module, etc., and the disclosure will not elaborate herein.

The method of the foregoing implementations illustrated in FIG. 1 and FIG. 2 can be realized based on the structure of the mobile phone.

Implementations further provide a computer storage medium. The computer storage medium is configured to store computer programs for electronic data interchange (EDI) which, when executed, are operable with a computer to perform some or all operations of any one of the foregoing implementations of the method for data allocation based on the dual Wi-Fi module.

Implementations further provide a computer program product. The computer program product includes a non-transitory computer-readable storage medium that stores computer programs. The computer programs are operable with a computer to execute some or all operations of any one of the foregoing implementations of the method for data allocation based on the dual Wi-Fi module.

It is to be noted that, for the sake of simplicity, the foregoing method implementations are described as a series of action combinations, however, it will be appreciated by those skilled in the art that the disclosure is not limited by the sequence of actions described. According to implementations, certain steps or operations may be performed in other order or simultaneously. Besides, it will be appreciated by those skilled in the art that the implementations described in the specification are exemplary implementations and the actions and modules involved are not necessarily essential to the disclosure.

In the above implementations, description of each implementation has its own emphasis. For details not described in one implementation, reference can be made to related part in other implementations.

It will be appreciated that the apparatuses disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device or unit, and may be electrical, or otherwise.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

Various functional units described in implementations herein may be integrated into one processing unit or may be present as a number of physically separated units, and two or more units may be integrated into one. The integrated unit may take the form of hardware or a software functional unit.

If the integrated units are implemented as software functional units and sold or used as standalone products, they may be stored in a computer readable storage medium. Based on such an understanding, the essential technical solution, or the portion that contributes to the prior art, or all or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations. The above storage medium may include various kinds of media that can store program codes, such as a universal serial bus (USB) flash disk, a read only memory (ROM), a random access memory (RAM), a mobile hard drive, a magnetic disk, or an optical disk.

It will be understood by those of ordinary skill in the art that all or part of the various methods of the implementations described above may be accomplished by means of a program to instruct associated hardware. The program may be stored in a computer-readable memory, which may include a flash memory, a ROM, a RAM, a magnetic disk, an optical disk, and so on.

The implementations of the disclosure are introduced in detail in the foregoing, and specific examples are applied here to set forth the principle and the implementation of the disclosure, and the foregoing illustration of the implementations is only to help in understanding the method and the core idea of the disclosure. Meanwhile, those of ordinarily skill in the art may make variations and modifications to the disclosure in terms of the specific implementations and application scopes according to the ideas of the disclosure. Therefore, the specification shall not be construed as limitations to the disclosure.

What is claimed is:

1. A method for data allocation, based on a dual Wi-Fi module comprising a first Wi-Fi module and a second Wi-Fi module, the method comprising:
   determining, in a dual Wi-Fi mode, a ratio for data packet allocation of a first Wi-Fi path to a second Wi-Fi path according to at least one of an application-type-based allocation policy, a data-packet-type-based allocation policy, a link-quality-based allocation policy, or an access point (AP)-type-based allocation policy, the first Wi-Fi path comprising a data path capable of data transmission to the first Wi-Fi module, and the second Wi-Fi path comprising a data path capable of data transmission to the second Wi-Fi module; and
   allocating data packets to the first Wi-Fi path and the second Wi-Fi path for transmission according to the ratio for data packet allocation;
   wherein, prior to determining the ratio for data packet allocation between the first Wi-Fi path and the second Wi-Fi path according to at least one of the application-type-based allocation policy, the data-packet-type-based allocation policy, the link-quality-based allocation policy, or the AP-type-based allocation policy in the dual Wi-Fi mode, the method further comprises:
   activating the dual Wi-Fi mode in response to an instruction for activating the dual Wi-Fi mode received; or
   activating the dual Wi-Fi mode in response to a condition for activating the dual Wi-Fi mode is met.

2. The method of claim 1, wherein activating the dual Wi-Fi mode in response to the instruction for activating the dual Wi-Fi mode received comprises:
   connecting the second Wi-Fi module to a second frequency band AP in response to a request for accessing the second frequency band AP received.

3. The method of claim 1, wherein activating the dual Wi-Fi mode in response to the instruction for activating the dual Wi-Fi mode received comprises:
   on condition that the first Wi-Fi module and the second Wi-Fi module are disconnected, selecting a first frequency band AP and a second frequency band AP; and
   connecting the first Wi-Fi module to the first frequency band AP and connecting the second Wi-Fi module to the second frequency band AP.

4. The method of claim 3, wherein selecting the first frequency band AP and the second frequency band AP comprises:
   searching a list of available first frequency band APs, and selecting an AP with highest signal strength from at least one first frequency historically connected to the first Wi-Fi module in the list of available first frequency band APs as the first frequency band AP; and
   searching a list of available second frequency band APs, and selecting an AP with the highest signal strength from at least one second frequency historically connected to the second Wi-Fi module in the list of available second frequency band APs as the second frequency band AP.

5. The method of claim 1, further comprising:
   in a single Wi-Fi mode, selecting a second frequency band AP and connecting the second Wi-Fi module to the second frequency band AP in response to a required download rate being greater than a maximum download rate provided by a first frequency band AP, or a required uplink rate being greater than a maximum uplink rate provided by the first frequency band AP, wherein the first Wi-Fi module is connected to the first frequency band AP.

6. The method of claim 1, wherein the condition for activating the dual Wi-Fi mode comprises:
   a specified type of application is activated.

7. The method of claim 1, wherein:
   determining the ratio for data packet allocation between the first Wi-Fi path and the second Wi-Fi path according to the application-type-based allocation policy comprises:
   determining a type of a foreground application currently running; and determining a target ratio for data packet allocation corresponding to the type of the foreground application currently running according to a correspondence relationship between foreground application types and ratios for data packet allocation; and allocating the data packets to the first Wi-Fi path and the second Wi-Fi path for transmission according to the ratio for data packet allocation comprises:

allocating the data packets to the first Wi-Fi path and the second Wi-Fi path for transmission according to the target ratio for data packet allocation.

8. The method of claim 1, wherein determining the ratio for data packet allocation between the first Wi-Fi path and the second Wi-Fi path according to the data-packet-type-based allocation policy comprises:

obtaining a type of the data packets; and determining the ratio for data packet allocation between the first Wi-Fi path and the second Wi-Fi path of the data packets according to a correspondence relationship between data packet types and Wi-Fi paths.

9. The method of claim 1, wherein determining the ratio for data packet allocation between the first Wi-Fi path and the second Wi-Fi path according to the link-quality-based allocation policy comprises:

detecting a link quality of the first Wi-Fi path and a link quality of the second Wi-Fi path; and determining the ratio for data packet allocation between the first Wi-Fi path and the second Wi-Fi path according to the link quality of the first Wi-Fi path and the link quality of the second Wi-Fi path.

10. The method of claim 1, wherein determining the ratio for data packet allocation between the first Wi-Fi path and the second Wi-Fi path according to the AP-type-based allocation policy comprises:

acquiring a type of an AP capable of data transmission to the first Wi-Fi module and a type of an AP capable of data transmission to the second Wi-Fi module;

determining security of the AP capable of data transmission to the first Wi-Fi module according to the type of the AP capable of data transmission to the first Wi-Fi module, and determining security of the AP capable of data transmission to the second Wi-Fi module according to the type of the AP capable of data transmission to the second Wi-Fi module;

determining a type of data packets and determining security requirements for the data packets; and determining the ratio for data packet allocation between the first Wi-Fi path and the second Wi-Fi path according to the security requirements, the security of the AP capable of data transmission to the first Wi-Fi module, and the security of the AP capable of data transmission to the second Wi-Fi module.

11. A mobile terminal, comprising:

a processor; and a memory storing one or more programs which, when executed by the processor, cause the processor to:

determine, in a dual Wi-Fi mode, a ratio for data packet allocation between a first Wi-Fi path and a second Wi-Fi path according to at least one of an application-type-based allocation policy, a data-packet-type-based allocation policy, a link-quality-based allocation policy, or an access point (AP)-type-based allocation policy, the first Wi-Fi path comprising a data path capable of data transmission to a first Wi-Fi module, and the second Wi-Fi path comprising a data path capable of data transmission to a second Wi-Fi module; and allocate data packets to the first Wi-Fi path and the second Wi-Fi path for transmission according to the ratio for data packet allocation;

wherein the processor is further configured to:

activate the dual Wi-Fi mode in response to an instruction for activating the dual Wi-Fi mode received; or activate the dual Wi-Fi mode in response to a condition for activating the dual Wi-Fi mode is met.

12. The mobile terminal of claim 10, wherein the processor configured to activate the dual Wi-Fi mode in response to the instruction for activating the dual Wi-Fi mode received is configured to:

connect the second Wi-Fi module to a second frequency band AP in response to a request for accessing the second frequency band AP received.

13. The mobile terminal of claim 11, wherein the processor configured to activate the dual Wi-Fi mode in response to the instruction for activating the dual Wi-Fi mode received is configured to:

on condition that the first Wi-Fi module and the second Wi-Fi module are disconnected, select a first frequency band AP and a second frequency band AP; and connect the first Wi-Fi module to the first frequency band AP and connect the second Wi-Fi module to the second frequency band AP.

14. The mobile terminal of claim 13, wherein the processor configured to select the first frequency band AP and the second frequency band AP is configured to:

search a list of available first frequency band APs, and select an AP with highest signal strength from at least one first frequency historically connected to the first Wi-Fi module in the list of available first frequency band APs as the first frequency band AP; and search a list of available second frequency band APs, and select an AP with highest signal strength from at least one second frequency historically connected to the second Wi-Fi module in the list of available second frequency band APs as the second frequency band AP.

15. The mobile terminal of claim 11, wherein the processor is further configured to:

in a single Wi-Fi mode, select a second frequency band AP and connect the second Wi-Fi module to the second frequency band AP in response to a required download rate being greater than a maximum download rate provided by the first frequency band AP, or a required uplink rate being greater than a maximum uplink rate provided by a first frequency band AP, wherein the first Wi-Fi module is connected to the first frequency band AP.

16. The mobile terminal of claim 11, wherein the condition for activating the dual Wi-Fi mode comprises:

a specified type of application is activated.

17. The mobile terminal of claim 11, wherein:

the processor configured to determine the ratio for data packet allocation between the first Wi-Fi path and the second Wi-Fi path according to the application-type-based allocation policy is configured to:

determine a type of a foreground application currently running; and determine a target ratio for data packet allocation corresponding to the type of the foreground application currently running according to a correspondence relationship between foreground application types and ratios for data packet allocation; and the processor configured to allocate the data packets to the first Wi-Fi path and the second Wi-Fi path for transmission according to the ratio for data packet allocation is configured to:
   allocate the data packets to the first Wi-Fi path and the second Wi-Fi path for transmission according to the target ratio for data packet allocation.

18. A non-transitory computer-readable storage medium storing a computer program which, when executed, by a processor of an electronic device, causes the processor to:
   determine, in a dual Wi-Fi mode, a ratio for data packet allocation between a first Wi-Fi path and a second Wi-Fi path according to at least one of an application-type-based allocation policy, a data-packet-type-based allocation policy, a link-quality-based allocation policy, or an access point (AP)-type-based allocation policy, the first Wi-Fi path comprising a data path capable of data transmission to a first Wi-Fi module, and the second Wi-Fi path comprising a data path capable of data transmission to a second Wi-Fi module; and
   allocate data packets to the first Wi-Fi path and the second Wi-Fi path for transmission according to the ratio for data packet allocation;
   wherein the processor is further configured to:
      activate the dual Wi-Fi mode in response to an instruction for activating the dual Wi-Fi mode received; or
      activate the dual Wi-Fi mode in response to a condition for activating the dual Wi-Fi mode is met.

\* \* \* \* \*